United States Patent [19]

Chrobaczek et al.

[11] Patent Number: 5,069,063
[45] Date of Patent: Dec. 3, 1991

[54] DEVICE FOR MEASURING A PULSATING VARIABLE IN AN INTERNAL COMBUSTION ENGINE

[76] Inventors: Martin Chrobaczek, Wiesentalstrasse 1c, D-7000 Stuttgart 70; Helmut Denz, Augustenstrasse 41, D-7000 Stuttgart 10; Andreas Roth, Horrheimer Strasse 15, D-7143 Vaihingen/Enz; Hans Heim, Weidenbrunnen 91B, D-7000 Stuttgart 50, all of Fed. Rep. of Germany

[21] Appl. No.: 536,619
[22] PCT Filed: Feb. 2, 1989
[86] PCT No.: PCT/DE89/00062
§ 371 Date: Jul. 11, 1990
§ 102(e) Date: Jul. 11, 1990
[87] PCT Pub. No.: WO89/07241
PCT Pub. Date: Aug. 10, 1989

[30] Foreign Application Priority Data

Apr. 2, 1988 [DE] Fed. Rep. of Germany ....... 3803276

[51] Int. Cl.$^5$ .................................. G01M 15/00
[52] U.S. Cl. ................................. 73/118.2; 73/117.3
[58] Field of Search ............... 73/118.2, 204.18, 115, 73/117.3

[56] References Cited

U.S. PATENT DOCUMENTS 4,311,042  1/1982  Hosoya et al. ................ 73/118.2

FOREIGN PATENT DOCUMENTS 1155885  5/1985  U.S.S.R. ........................... 73/115

Primary Examiner—Jerry W. Myracle

[57] ABSTRACT

A device for detecting a pulsating variable by fixed-angle dual sampling with slight filtering in which the pulsating variable is filtered and/or damped in such a manner that a quasi-sinusoidal variation is obtained. The signal thus obtained is a crank-angle-synchronous signal sampled twice per duration of one period. From these two measurement values, a current mean value of the pulsating variable is determined once per duration of the period.

14 Claims, 3 Drawing Sheets

DEVICE FOR MEASURING A PULSATING VARIABLE IN AN INTERNAL COMBUSTION ENGINE

BACKGROUND OF THE INVENTION

The invention relates to a device for detecting a pulsating variable in an internal combustion engine by sampling a measurement value in synchronization with a crankshaft angle every half-period of the pulsating variable.

It is known that significant variables in internal combustion engines such as, for example, the vacuum in the intake pipe are quasi-continuous variables which pulsate or periodically fluctuate with the power cycle of the internal combustion engine. However, it is the mean value of these variables which is needed for regulating the internal combustion engine.

Devices for detecting a periodically fluctuating variable, for example the vacuum in the intake pipe, and for determining the mean value of this variable are already known. Thus, in German Offenlegungsschrift 3,223,328, the pressure is measured ignition-synchronously once per ignition interval and from the instantaneous value of the pressure thus obtained the mean value is calculated. In case of a phase shift of the pressure signal which is caused, for example, by fuel condensates which can become deposited in the hose between the intake pipe and pressure transducer, however, the solution proposed in German Offenlegungsschrift 3,223,328 leads to errors in the averaging.

In German Offenlegungsschrift 3,212,561, the intake pipe pressure is determined by fixed-angle dual sampling per ignition interval. If only the fundamental oscillation is present, the dual sampling of the intake pipe pressure per ignition interval would be sufficient for determining the exact mean value of the intake pipe pressure. At certain rotational speeds, however, higher-frequency components are superimposed on the periodic intake pipe pressure variation which could lead to errors occurring in the averaging even with dual sampling.

SUMMARY OF THE INVENTION

The object of the invention is a device in which a signal variation is almost sinusoidal or quasi-sinusoidal with the duration of the period of the ignition interval for all rotational speeds being obtained by damping of either the pulsating variable itself or the output signal of a sensor which detects a pulsating variable. Thus, an error-free mean value can be formed from this signal variation in any speed range and in any phase relationship by dual sampling per ignition interval or duration of the period of the pulsating variable. The object of the invention is achieved by providing a sensor associated with a filtering device and/or a damping device. The means value is formed from two measurement values per period.

If the pulsating variable is the intake pipe pressure, an almost sinusoidal pressure variation can be obtained for all rotational speeds at the pressure sensor by filtering the intake pipe pressure by a pneumatic filter.

By suitably designing the pneumatic filter, it can be prevented that condensate reaches the pressure sensor and leads to a destruction of the pressure sensor. It is a further advantage that the maximum pressure controlled by the pressure sensor or the controllable pressure range does not need to be unnecessarily large since the pulsations are damped when they reach the sensor.

If it is intended to arrange the pressure sensor in the control device, the pneumatic filter is connected to the intake pipe with an additional variable-length hose. As a result, the control device can be installed at any point without having to change the dimensioning of the pneumatic filter.

In the case of pressure sensors which are arranged outside the control device, a particularly simple pneumatic filter can be used which only consists of a throttle and a short hose.

Instead of a pneumatic filter for smoothing the intake pipe pressure at the input to the pressure sensor, an electric or electronic filter can also be used for smoothing the sensor output signal.

It is particularly advantageous that other pulsating variables can also be damped by an electric or electronic filter following the respective sensor, in such a manner that a quasi-sinusoidal signal is produced. A subsequent electronic filter, however, is only advantageous with sensors having an approximately linear characteristic since severely curved characteristics otherwise lead to a mean value error.

It is also advantageous that the sensor itself can be constructed in such a manner that the filtering characteristics are contained in the sensor itself. Thus, for example, the thermal characteristic of a hot-film air-flow meter can be tuned in such a manner that higher-frequency pulsations of the air-flow stream are filtered and only the fundamental oscillation is contained in the output signal.

A signal which is quasi-sinusoidal at all rotational speeds, from which an error-free mean value can be formed in each speed range by dual sampling per ignition interval, can be advantageously generated by each type of filtering mentioned.

The present invention both as to its construction so to its mode of operation, together with additional objects and advantages thereof will be best understood from the following detailed description of the preferred embodiments with reference to the the accompanying drawings.

DESCRIPTION OF THE PREFERRED EMBODIMENTS

Figure 1A:
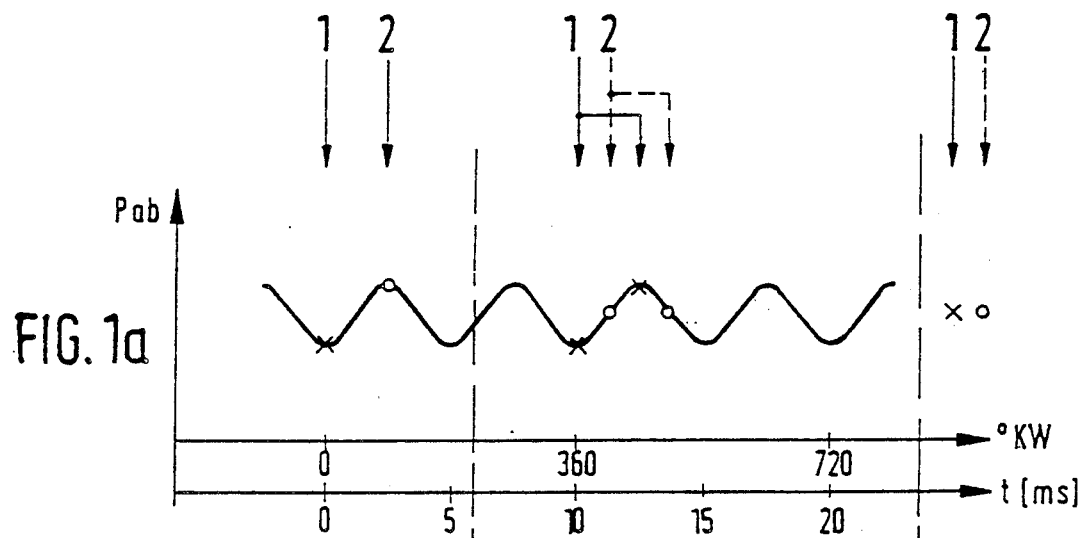
FIGS. 1a to c show, representatively for other pulsating variables, the variation of the intake pipe pressure against crankshaft angle position ° KW or time t at various operating conditions.
Figure 1B:
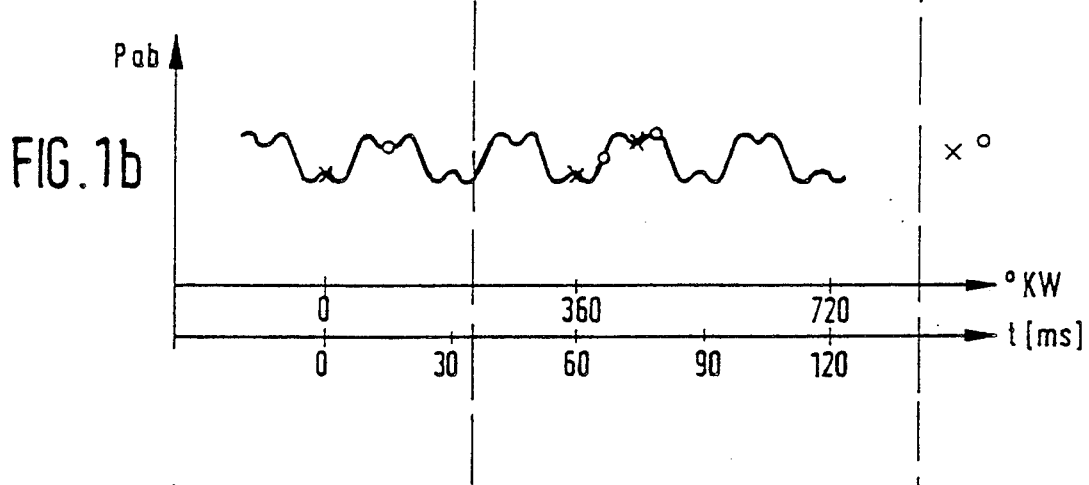
Figure 1C:
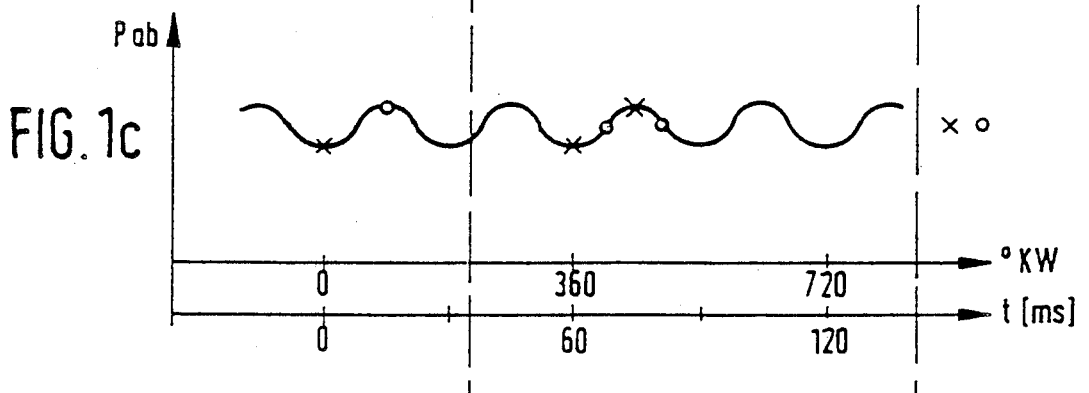

In FIGS. 1a to c, the intake pipe pressure of a four-cylinder internal combustion engine is plotted against the crankshaft angle or time, respectively. The ignition interval corresponds to one period of the intake pipe pressure signal, that is to say 180° KW in a four-cylinder internal combustion engine In a region 1 of FIGS. 1a to c, the example of an ignition-synchronous pressure detection once per ignition is shown in a fixed angle relationship. Expressed in degrees KW, therefore, the pressure is detected every 180° in the four-cylinder internal combustion engine. The symbols x and o mark two different angle positions at which the instantaneous value of the pressure deviates maximally from the mean value. If the pressure is detected at x, the value determined is smaller than the mean value and it would be greater at o.

In a region 2, the example of an ignition-synchronous pressure detection twice per ignition is shown in two fixed-angle crankshaft positions. Thus, the intake pipe pressure is detected every 90° KW in a four-cylinder internal combustion engine. The symbols x and o mark two different angle positions at which the instantaneous value of the intake pipe pressure can be detected, that is to say sampling always occurs either at x or always at o. In region 3, the mean value of the measurement values obtained during the dual sampling at the points specified in region 2 is specified by markings x and o.

FIG. 1a represents the unfiltered intake pipe pressure variation against the crankshaft angle ° KW and time t, respectively, at a high rotational speed, for example at 6000 revolutions per minute, where there is essentially only a fundamental oscillation in many engines. The mean value sketched in region 3, which is calculated from. the measurement values x, x and o, o respectively sketched in region 2, corresponds to the actual mean value of the intake pipe pressure. FIG. 1b shows the unfiltered intake pipe pressure variation against the crankshaft angle for a low to medium rotational speed, for example 2000 revolutions per minute. At low and medium rotational speed, higher-frequency components are superimposed on the fundamental frequency of the intake pipe pressure oscillations, which components lead to the situation that the intake pipe pressure value obtained by fixed-angle dual sampling at half the ignition interval at the crank angle positions represented by x and o and subsequent averaging, does not necessarily correspond to the actual mean value. FIG. 1c shows the filtered intake pipe pressure variation against the crankshaft angle for the same rotational speed as 1b. This filtered intake pipe pressure variation is achieved either by connecting a pneumatic filter in front of the pressure sensor or by electronic filtering of the pressure sensor output signal. Suitable dimensioning of the filter has the result that an almost sinusoidal output signal of the pressure sensor is again achieved by the pressure sensor even at low rotational speeds. The fixed-angle dual sampling per ignition interval or period interval thus again leads to a correct mean value. FIG. 1c shows two mean values of the intake pipe pressure obtained by sampling at points x, x and o, o.

Figure 2:
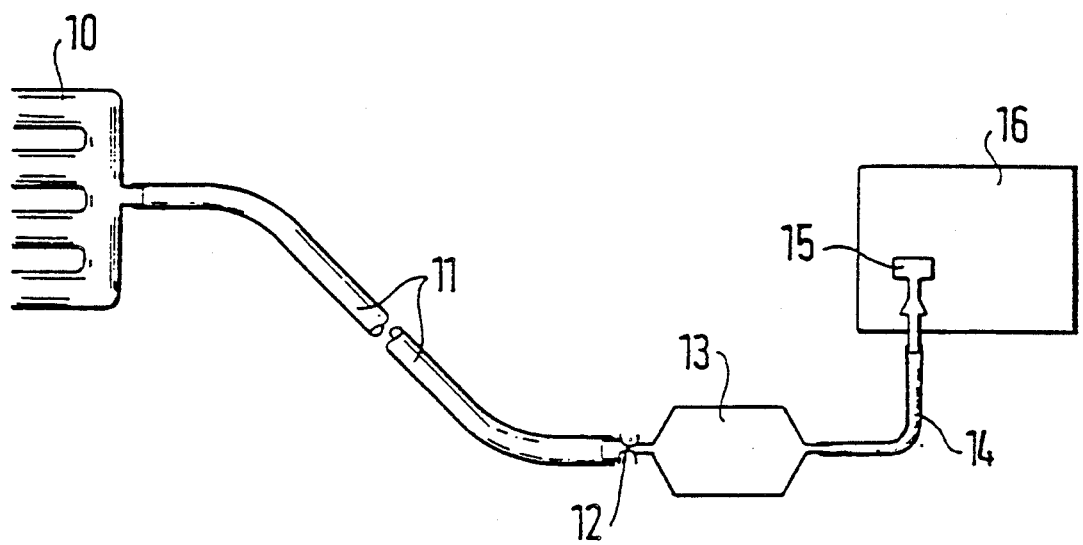
FIG. 2 shows the basic configuration of an embodiment of the device according to the invention in which a pressure sensor is arranged as sensor inside the control device.

FIG. 2 shows an illustrative embodiment of a device according to the invention comprising a pneumatic filter, the pulsating variable to be detected being the intake pipe pressure. From the intake pipe 10, a hose of variable length 11 (<3 m) and with a sufficiently large diameter for example, 5 mm to avoid an unwanted delay in the pressure increase, leads to a throttle 12 at the input of the condensate precipitator 13. Here, the condensate precipitator 13 and the throttle 12 form a pneumatic filter having a time constant of about 20 ms. Such a value for the time constant of the filter has been found to be acceptable with a fastest possible throttle flap opening of 50 ms. From the condensate precipitator 13, a short hose of fixed length (10 to 20 cm) 14 with a diameter of 3 mm leads to the pressure sensor 15 which is directly installed in the control device 16.

The dimensioning of the throttle 12 and of the condensate precipitator 13, which form the pneumatic filter, is selected in such a manner that the filtered intake pipe pressure prevailing at the pressure sensor 15 exhibits a sinusoidal pulsation at low rotational speeds. It is ensured in this case that the exact mean value of the intake pipe pressure can be calculated with dual pressure sampling per ignition. The dimensions of the throttle and of the condensate precipitator are experimentally optimized. Since the pneumatic filter 12, 13, together with the short hose 14, exhibits a geometry which remains the same independently of the location of installation of the control device, the pneumatic filter has to be matched up only once.

The condensate precipitator 13 should be preferably installed at the lowest point in the device. For eliminating any condensates produced, means are provided which are not shown in the illustrative embodiment of FIG. 2 (for example evaporation of the condensates by suitable heat supply).

In a special illustrative embodiment, the pressure line from the control device to the intake pipe drops continuously in order to avoid a destruction of the pressure sensor by condensates.

Figure 3:
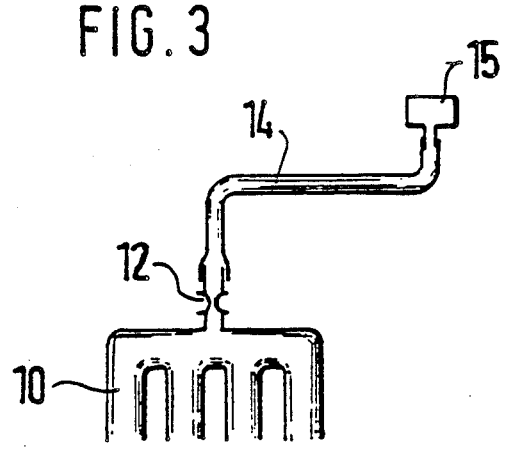
FIG. 3 shows an illustrative embodiment of the device according to the invention with a pressure sensor which is mounted outside the control device.

FIG. 3 shows an additional illustrative embodiment in which the pressure sensor or pressure filter 15 is mounted outside the control device 16 on the body of the internal combustion engine. In this arrangement, the pressure sensor 15 is connected via a hose 14, which corresponds to the short hose 14 of FIG. 2, to the intake pipe 10, a throttle 12 being provided at the intake pipe 10.

The throttle 12 and the hose 14 form the pneumatic filter which damps the pressure fluctuations occurring in the intake pipe and thus supplies an approximately quasi-sinusoidal pressure variation which is to be evaluated to the pressure sensor 15. The time constant of the pneumatic filter (filter constant) is about 20 ms.

Since the pressure sensor 15 does not need to be accommodated in the control device 16, it can be mounted at a selected position of the body of the internal combustion engine, and thus the length of the hose 14 and the diameter, respectively, and thus also the volume of this hose can be selected, independently of the type of internal combustion engine, in such a manner that a constant hose volume is obtained for a given internal combustion engine. Accordingly, the pneumatic filter can be tuned to the required clamping, independently of the type of the internal combustion engine, by means of a throttle at the intake pipe in connection with the quasi-constant hose volume.

In a further illustrative embodiment, the pressure sensor is connected to the intake pipe via a pressure line without special filtering devices. In this case, the electronic filter mentioned must be connected after the pressure sensor.

In the control device, the mean value, which always corresponds to the exact mean value independently of any phase shifts which may occur in the intake pipe pressure pulsations, is determined from the two pressure values which are sampled twice per ignition or period at fixed crankshaft angle positions (angle-synchronously). The mean value is calculated immediately after the second pressure value is available. The respectively associated load condition is then determined from the mean value of the pressure.

Figure 4:
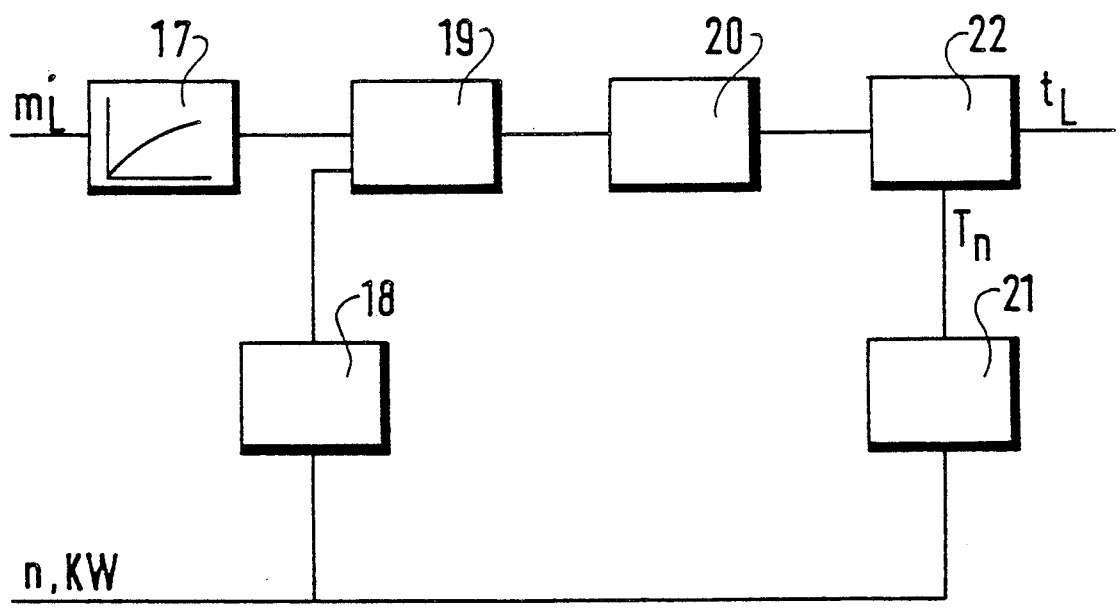
FIG. 4 shows an illustrative embodiment of the signal evaluation, with a hot-film air-flow meter (HFM) as sensor.

FIG. 4 shows an embodiment of the invention in which the air-flow stream $m_L$ taken in, which is a pulsating variable due to the individual intake strokes, is measured by means of a hot-film air flow sensor or hot-film air flow meter 17.

The air-flow stream taken in is not a purely sinusoidal oscillation due to resonances in the intake pipe. The hot-film air-flow sensor 17 is thus tuned in such a manner that the harmonics superimposed on the air-flow stream taken in are as completely suppressed in its output signal as possible. The hot-film air flow sensor therefore supplies a quasi-sinusoidal output signal which corresponds to the air-flow stream $m_L$ taken in the amplitude of which is damped.

The hot-film air-flow sensor 17 is tuned by determining its thermal time constant. A particularly suitable value for this time constant is approximately 20 to 50 ms since such a time constant still ensures that, with load changes, a sufficiently rapid change in the output signal results.

In this illustrative embodiment, the variable to be measured is filtered or damped in the sensor, the hot-film air-flow sensor itself so that no separate filtering device or damping device is needed.

In the illustrative embodiment of FIG. 4, the output signal supplied by the hot-film air-flow sensor 17 is sampled at half the ignition interval in a sampling and linearizing device 19. The fixed-angle trigger markers required for this are generated from the rotational speed/crankshaft signal n/KW in a trigger device 18. Because of the highly non-linear characteristic of the hot-film air-flow sensor 17, the sampled values are linearized in device 19 so that sample values are available which are directly proportional to the air-flow stream.

The sampling and linearizing device 19 supplies one measurement value per half ignition interval and a mean value is formed from two measurement values in each case in the mean value stage 20. The load signal $t_L$ is obtained by multiplication by the period Tn and division by a matching constant $K_{HFM}$. The two said mathematical operations occur in a block 22 at the output of which the load signal $t_L$ is generated and which is supplied with the period Tn generated in a stage 21. The devices 18 to 22 can be contained in a control device, $t_L$ is further processed in the control device, for example for calculating the injection time.

The evaluating circuit shown in FIG. 4 can also be correspondingly used for the illustrative embodiments of FIG. 2 or 3. In this connection, an offset correction also occurs in stage 19 in addition to the sampling. To determine the load signal, the averaged intake pipe pressure is multiplied by a set of characteristics dependent on the rotational speed and divided by a matching constant $K_{DF}$ in stage 22.

All of the filtering devices mentioned in the illustrative embodiments can also be understood to be damping devices since the filtering out of harmonics also leads to a damping of the signals.

Instead of a hot-film air-flow meter, another sensor can also be used for determining the air-flow stream, the prerequisite being that it can be tuned in such a manner, that is to say that its time constant can be selected in such a manner that the harmonics of the air-flow stream can be filtered out.

While the invention has been illustrated and described as embodied in a device for detecting a pulsating variable in an internal combustion engine, it is not intended to be limited to the details shown, since various modifications and structural changes may e made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics o the generic or specific aspects f this invention.

What is claimed as new and desired to be protected by Letters Patent is set forth in the appended claims.

1. A device for detecting a pulsating variable in an internal combustion engine, comprising at least one of filtering means and damping means; a sensor connected with said at least one of filtering means and damping means for sensing the pulsating variable; and means arranged downstream of said sensor and connected therewith for sampling a measurement value of the pulsating variable every half-period of the pulsation variable in synchronization with an engine crankshaft angle, and for forming a mean value of the pulsating variable from two measurement values per period.

2. A device as set forth in claim 1, wherein said at least one of filtering means and damping mans is filtering the pulsating variable in such a manner that the pulsating variable has a quasi-sinusoidal variation.

3. A device as set forth in claim 1, wherein said at least one of filtering means and damping means is pneumatic.

4. A device as set forth in claim 1, further comprising at least one of electronic filtering means and electronic damping means arranged downstream of said sensor.

5. A device as set forth in claim 1, wherein aid sampling means samples the measurement value of the pulsating variable at arbitrarily definable crankshaft angle positions, a distance between the crankshaft angle positions being equal to half of the period.

6. A device as set forth in claim 1, wherein said sampling device effects sampling at an interval of 720°KW/2n, wherein KW —is crank angle, and n—number of cylinders of the internal combustion engine.

7. A device as set forth in claim 1, wherein said filtering means comprises a pneumatic filter including at least one condensate precipitator and a throttle arranged at an input of said condensate precipitator.

8. A device as set forth in claim 7, wherein said throttle is located at a lowest point between an intake pipe and said sensor.

9. A device as set forth in claim 1, further comprising a short hose for connecting said filtering means with said sensor, said filtering device, said short hose, and said sensor exhibiting a constant geometry.

10. A device as set forth in claim 1, further comprising control means that comprises said sampling means, said sensor being located in said control means.

11. A device as set forth in claim 1, wherein said sensor is located outside of said control means.

12. A device as set forth in claim 1, wherein said filtering means comprises a pneumatic filter comprising a throttle at an intake pipe of the internal combustion engine and hose connected thereto said hose having at least one of a predetermine length and a predetermine cross-section for obtaining a predetermined filter constant which is always constant for a given internal combustion engine, and said hose being connected to aid sensor, said device further comprising control means, said sensor being connected outside said control means.

13. A device as set forth in claim 1, wherein the pulsating variable is pressure in an intake pipe of the internal combustion engine, said sensor comprising a pressure sensor for measuring the intake pipe pressure.

14. A device as set forth in claim 1, wherein the pulsating variable is an air-flow stream taken in, said sensor comprising a hot-film air flow sensor having a thermal time constant such that an output signal thereof is quasi-sinusoidal.

* * * * *